(12) United States Patent
Poole et al.

(10) Patent No.: US 11,031,850 B2
(45) Date of Patent: Jun. 8, 2021

(54) ROBOT DRIVE WITH ISOLATED OPTICAL ENCODER

(71) Applicant: Persimmon Technologies, Corp., Wakefield, MA (US)

(72) Inventors: Dennis Poole, East Derry, NH (US); Martin Hosek, Lowell, MA (US)

(73) Assignee: Persimmon Technologies Corporation, Wakefield, MA (US)

( * ) Notice: Subject to any disclaimer, the term of this patent is extended or adjusted under 35 U.S.C. 154(b) by 0 days.

(21) Appl. No.: 16/593,050

(22) Filed: Oct. 4, 2019

(65) Prior Publication Data

US 2020/0036267 A1 Jan. 30, 2020

Related U.S. Application Data

(60) Division of application No. 15/465,101, filed on Mar. 21, 2017, now Pat. No. 10,476,354, which is a
(Continued)

(51) Int. Cl.
*H02K 11/22* (2016.01)
*H02K 5/22* (2006.01)
(Continued)

(52) U.S. Cl.
CPC ............... *H02K 11/22* (2016.01); *B25J 9/12* (2013.01); *B25J 13/088* (2013.01); *H02K 5/00* (2013.01);
(Continued)

(58) Field of Classification Search
CPC ........ H02K 11/22; H02K 5/22; H02K 7/1004; H02K 41/033; H02K 5/225; H02K 5/00;
(Continued)

(56) References Cited

U.S. PATENT DOCUMENTS

| | | | |
|---|---|---|---|
| 3,602,748 A | 8/1971 | Locke | |
| 4,414,523 A | 11/1983 | Pieters | |

(Continued)

FOREIGN PATENT DOCUMENTS

| | | |
|---|---|---|
| CN | 2669461 Y | 1/2005 |
| EP | 0111764 A1 | 6/1984 |

(Continued)

OTHER PUBLICATIONS

"A Passive Rotor Transverse Flux Motor", Popan et al., Workshop on Variable Reluctance Electrical Machines, Technical University of Cluj-Napoca, Sep. 17, 2002, 4 pages.

*Primary Examiner* — Naishadh N Desai
(74) *Attorney, Agent, or Firm* — Harrington & Smith (57) ABSTRACT

An apparatus including a frame, an optical sensor connected to the frame, and an environment separation barrier. The frame is configured to be attached to a housing of a motor assembly proximate an aperture which extends through the housing. The optical sensor comprises a camera. The environment separation barrier is configured to be connected to the housing at the aperture, where the environment separation barrier is at least partially transparent and located relative to the camera to allow the camera to view an image inside the housing through the environment separation barrier and the aperture.

9 Claims, 9 Drawing Sheets

Related U.S. Application Data continuation-in-part of application No. 13/744,900, filed on Jan. 18, 2013, now Pat. No. 9,800,114, which is a division of application No. 13/618,315, filed on Sep. 14, 2012, now abandoned.

(60) Provisional application No. 62/310,989, filed on Mar. 21, 2016, provisional application No. 61/627,030, filed on Sep. 16, 2011, provisional application No. 61/683,297, filed on Aug. 15, 2012.

(51) Int. Cl.
| | | |
|---|---|---|
| *H02K 7/10* | (2006.01) | |
| *B25J 13/08* | (2006.01) | |
| *H02K 5/10* | (2006.01) | |
| *H02K 5/00* | (2006.01) | |
| *H02K 9/22* | (2006.01) | |
| *H02K 41/03* | (2006.01) | |
| *H02K 21/44* | (2006.01) | |
| *H02K 5/128* | (2006.01) | |
| *B25J 9/12* | (2006.01) | |
| *H02K 3/30* | (2006.01) | |
| *H02K 15/12* | (2006.01) | |
| *H02K 3/44* | (2006.01) | |

(52) U.S. Cl.
CPC .............. *H02K 5/10* (2013.01); *H02K 5/128* (2013.01); *H02K 5/225* (2013.01); *H02K 7/1004* (2013.01); *H02K 9/22* (2013.01); *H02K 21/44* (2013.01); *H02K 41/033* (2013.01); *H02K 3/30* (2013.01); *H02K 3/44* (2013.01); *H02K 15/12* (2013.01); *Y10S 901/23* (2013.01)

(58) Field of Classification Search
CPC .......... H02K 5/128; H02K 21/44; H02K 9/22; H02K 5/10; H02K 3/30; H02K 3/44; H02K 15/12; B25J 9/12; B25J 13/088; Y10S 901/23
See application file for complete search history.

(56) References Cited

U.S. PATENT DOCUMENTS

| | | |
|---|---|---|
| 4,486,677 A | 12/1984 | Yamamoto et al. |
| 4,748,355 A | 5/1988 | Anderson |
| 4,749,898 A | 6/1988 | Suzuki et al. |
| 4,952,830 A | 8/1990 | Shirakawa |
| 5,113,102 A | 5/1992 | Gilmore |
| 5,291,087 A | 3/1994 | Pollick et al. |
| 5,394,043 A | 2/1995 | Hsia |
| 5,397,212 A | 3/1995 | Watanabe et al. |
| 5,608,277 A | 3/1997 | Emery et al. |
| 5,720,590 A | 2/1998 | Hofmeister |
| 5,813,823 A | 9/1998 | Hofmeister |
| 5,899,658 A | 5/1999 | Hofmeister |
| 5,914,548 A | 6/1999 | Watanabe et al. |
| 6,150,747 A | 11/2000 | Smith et al. |
| 6,274,962 B1 | 8/2001 | Kliman |
| 6,355,999 B1 | 3/2002 | Kichiji et al. |
| 6,653,758 B2 | 11/2003 | Tsuneyoshi et al. |
| 6,664,535 B1 * | 12/2003 | Nahum .............. G01D 5/34792 250/231.14 |
| 6,700,249 B1 | 3/2004 | Botos |
| 6,709,521 B1 | 3/2004 | Hiroki |
| 6,710,562 B1 | 3/2004 | Kalb et al. |
| 6,888,284 B2 | 5/2005 | Eggers et al. |
| 6,960,758 B2 | 11/2005 | Tenca et al. |
| 7,011,554 B2 | 3/2006 | Taniguchi et al. |
| 7,336,012 B2 | 2/2008 | Tanaka |
| 7,847,442 B2 | 12/2010 | Rohner et al. |
| 7,898,135 B2 | 3/2011 | Flynn |
| 8,063,517 B2 | 11/2011 | Bott et al. |
| 8,102,090 B2 | 1/2012 | Takeuchi |
| 8,237,391 B2 | 8/2012 | Krupyshev et al. |
| 8,283,813 B2 | 10/2012 | Gilchrist et al. |
| 8,716,909 B2 | 5/2014 | Hosek et al. |
| 9,202,733 B2 | 12/2015 | Hosek |
| 9,230,840 B2 * | 1/2016 | Hiroki ............... H01L 21/67196 |
| 2003/0164552 A1 | 9/2003 | Tamura et al. |
| 2004/0001750 A1 | 1/2004 | Kremerman |
| 2005/0286993 A1 | 12/2005 | Minami et al. |
| 2006/0290226 A1 | 12/2006 | Ohkawa |
| 2007/0280813 A1 | 12/2007 | Nakamura et al. |
| 2008/0315692 A1 | 12/2008 | Beetz |
| 2009/0243413 A1 * | 10/2009 | Gilchrist ................ H02K 29/03 310/90.5 |
| 2011/0156514 A1 | 6/2011 | Watanabe et al. |
| 2011/0266900 A1 | 11/2011 | Gaumer |
| 2013/0028700 A1 | 1/2013 | Gilchrist et al. |
| 2013/0121798 A1 | 5/2013 | Hosek |
| 2014/0077637 A1 | 3/2014 | Hosek et al. |
| 2015/0214086 A1 | 7/2015 | Hofmeister et al. |
| 2015/0303764 A1 | 10/2015 | Hosek et al. |
| 2015/0311639 A1 | 10/2015 | Neureuter |
| 2016/0190728 A1 | 6/2016 | VanZuilen |
| 2016/0229296 A1 | 8/2016 | Hosek et al. |
| 2017/0036358 A1 | 2/2017 | Hosek et al. |

FOREIGN PATENT DOCUMENTS

| | | |
|---|---|---|
| EP | 0385203 A1 | 9/1990 |
| JP | 59-096843 A | 6/1984 |
| JP | 06-042602 | 2/1994 |
| JP | 8003191 Y | 1/1996 |
| JP | H-08-19985 A | 1/1996 |
| JP | 08-066880 | 3/1996 |
| JP | 10-128692 | 5/1998 |
| JP | 2002534282 A | 10/2002 |
| JP | 2003-220586 | 8/2003 |
| JP | 2004-146714 | 5/2004 |
| JP | 2008167589 A | 7/2008 |
| JP | 2009038908 A | 2/2009 |
| JP | 2009521196 A | 5/2009 |
| JP | 2009-303331 | 12/2009 |
| JP | 2010040947 A | 2/2010 |
| JP | 2010050114 A | 3/2010 |
| JP | 2010207938 A | 9/2010 |
| JP | 201351329 A | 4/2013 |
| JP | 2014527314 A | 10/2014 |
| JP | 2006013371 A | 1/2016 |
| KR | 20010092771 | 10/2001 |
| WO | WO-91/03095 | 3/1991 |
| WO | WO-2006/114390 A1 | 11/2006 |
| WO | WO-2006/124934 A2 | 11/2006 |
| WO | WO-2006/130954 A1 | 12/2006 |
| WO | WO-2009/003196 A1 | 12/2008 |
| WO | WO-2011075345 A1 | 6/2011 |
| WO | WO-2013040401 A1 | 3/2013 |

* cited by examiner

ROBOT DRIVE WITH ISOLATED OPTICAL ENCODER

CROSS REFERENCE TO RELATED APPLICATION

This application is a divisional application of copending U.S. application Ser. No. 15/465,101 filed Mar. 21, 2017, which claims priority under 35 USC 119(e) to U.S. provisional patent application No. 62/310,989 filed Mar. 21, 2016 which is hereby incorporated by reference in its entirety, and is a continuation-in-part of U.S. patent application Ser. No. 13/744,900 filed Jan. 18, 2013 which is a divisional patent application of application Ser. No. 13/618,315 filed Sep. 14, 2012, which claims priority under 35 USC 119(e) on Provisional Patent Application No. 61/627,030 filed Sep. 16, 2011 and Provisional Patent Application No. 61/683,297 filed Aug. 15, 2012, which are hereby incorporated by reference in their entireties.

BACKGROUND

Technical Field

The exemplary and non-limiting embodiments relate generally to position sensing and, more particularly, to a robot drive position sensor having an optical encoder.

Brief Description of Prior Developments

U.S. patent publication Nos. 2009/0243413 A1 and 2015/0303764 A1, which are hereby incorporated by reference in their entireties, disclose a barrier between a non-optical encoder read-head and an encoder disk.

SUMMARY

The following summary is merely intended to be exemplary. The summary is not intended to limit the scope of the claims.

In accordance with one aspect, an example embodiment is provided in an apparatus comprising a frame, where the frame is configured to be attached to a housing of a motor assembly proximate an aperture which extends through the housing; an optical sensor connected to the frame, where the optical sensor comprises a camera; and an environment separation barrier configured to be connected to the housing at the aperture, where the environment separation barrier is at least partially transparent and located relative to the camera to allow the camera to view an image inside the housing through the environment separation barrier and the aperture.

In accordance with another aspect, an example method comprises providing a read-head comprising a frame and a camera connected to the frame; connecting the read-head to a housing of a motor assembly, where the frame of the read-head is connected to the housing proximate an aperture which extends through the housing; and locating an environment separation barrier at the aperture to separate a first environmental area inside the housing from a second environmental area in which the camera is located, where the environment separation barrier is at least partially transparent and located relative to the camera to allow the camera to view an image inside the housing through the environment separation barrier and the aperture.

In accordance with another aspect, an example method comprises illuminating a reference member located inside a housing of a motor assembly by a light emitter of a read-head, where the read-head is located at least partially outside of the housing; viewing an image of the reference member by a camera of the read-head, where the camera is located at least partially outside of the housing, where the image is viewed by the camera though an aperture in the housing and through a transparent environment separation barrier located at the aperture, where the transparent environment separation barrier seals a first environment inside the housing from a second environment in which the sensor is located, and where the camera is located outside of the first environment and the transparent environment separation barrier allows the camera to view the image coming from inside the housing while the camera is outside of the first environment.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
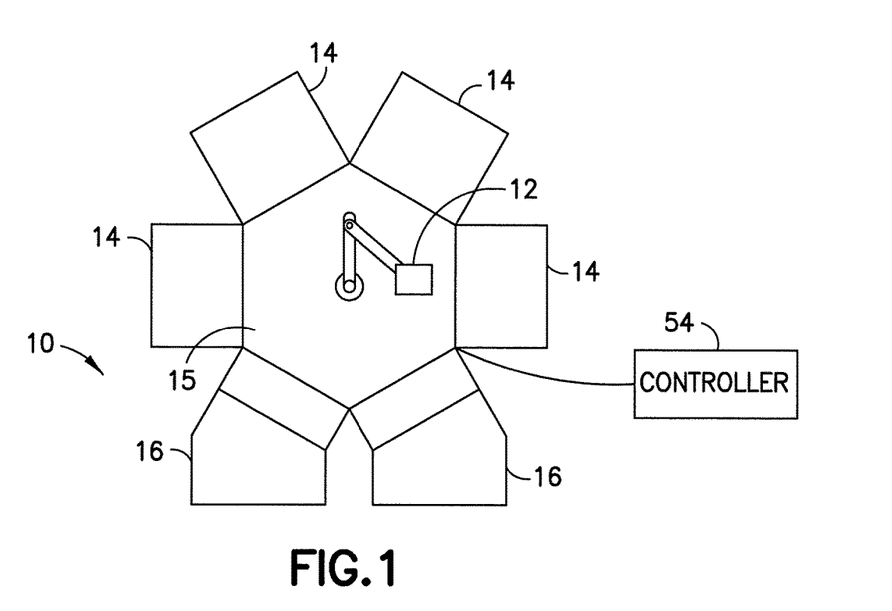
FIG. 1 is a schematic view of a substrate processing apparatus.

Referring to FIG. 1, there is shown a schematic top plan view of an example substrate processing apparatus 10 having a substrate transport apparatus 12. Although the present invention will be described with reference to the embodiments shown in the drawings, it should be understood that the present invention may be embodied in many forms of alternative embodiments. In addition, any suitable size, shape or type of materials or elements could be used.

In addition to the substrate transport apparatus 12, the substrate processing apparatus 10 includes multiple substrate processing chambers 14 and substrate cassette elevators 16 connected to a vacuum chamber 15. The transport apparatus 12 is located, at least partially, in the chamber 15 and is adapted to transport planar substrates, such as semiconductor wafers or flat panel displays, between and/or among the chambers and elevators 16. In alternate embodiments, the transport apparatus 12 could be used in any suitable type of substrate processing apparatus.

A conventional vacuum environment robotic manipulator typically includes a drive unit which houses all active components of the robotic manipulator, e.g., actuators and sensors, and one or more arms, as discussed above, driven by the drive unit. The arm(s) are typically passive mechanisms, i.e., they do not include any active components, such as actuators and sensors. This is primarily due to difficulties with out-gassing, power distribution and heat removal in vacuum environments.

Figure 2:
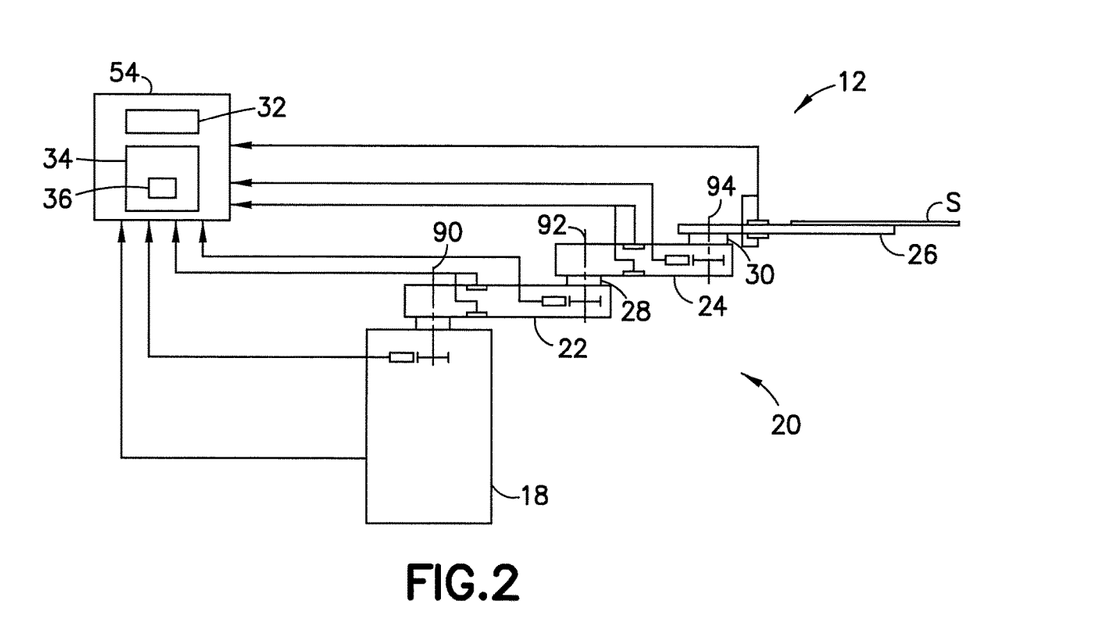
FIG. 2 is a diagram illustrating some of the components of the apparatus shown in FIG. 1.

Referring also to FIG. 2, the substrate transport apparatus 12 (or vacuum-compatible robot system) includes a drive 18 and an arm 20. The drive 18 has two rotary axes. The arm 20 is coupled to the drive 18. In this example embodiment the arm 20 includes a first link 22, a second link 24 and an end-effector 26. The first link 22 is attached directly to a first rotary axis of the drive 18. The second link 24 is coupled to the first link 22 through a first rotary joint 28. The end-effector 26 is coupled to the second link 24 through a second rotary joint 30. In the embodiment shown, arm 20 has three rotary axes 90, 92, 94 formed at the drive 18 and the joints 28, 30. In this embodiment the second link 24 is driven through a belt/band drive which may include a first pulley, attached to a second rotary axis of the drive 18, a first belt/band and a second pulley, attached to the second link 24 of the arm 20. The end-effector 26 is constrained to point approximately in a radial direction with respect to the drive 18 through another belt/band arrangement, which may include a third pulley, pivotably coupled to the first link 22, a second belt/band and a fourth pulley, attached to the end-effector 26. In various different example embodiments, any suitable drive, actuator, sensor or otherwise may provide features as disclosed herein; in any combination and/or as disclosed in U.S. Pat. Nos. 9,202,733 and 8,716,909 which are all hereby incorporated by reference in their entireties herein.

Although the substrate transport apparatus 12 is described with respect to a vacuum robot, any suitable substrate transport apparatus; atmospheric or otherwise may be provided having features as disclosed. Substrate transport apparatus 12 has a controller 54, the drive unit 18 and the arm 20, and is configured to transport substrate S. Controller 54 may have at least one processor 32, at least one memory 34 and software or computer code 36 configured to control the drive 18 and process input from the sensors. Arm 20 is shown as a SCARA type arm and driven by drive unit 18, but in alternate embodiments any suitable arm could be provided. Although substrate transport apparatus 12 is described with respect to a two link arm, any suitable number of links may be provided. Further, any suitable number of arms may be provided. Further, any combination of rotary and/or linear axis may be provided on any suitable arm.

Figure 3:
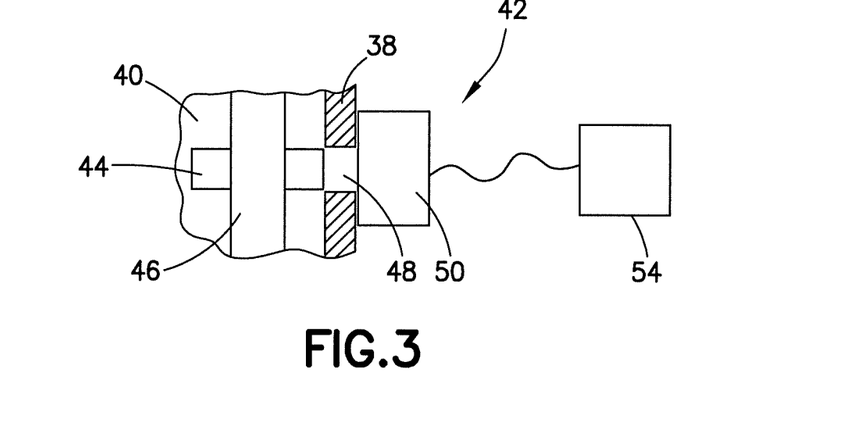
FIG. 3 is a schematic diagram illustrating some of the components shown in FIGS. 1-2.
Figure 3A:
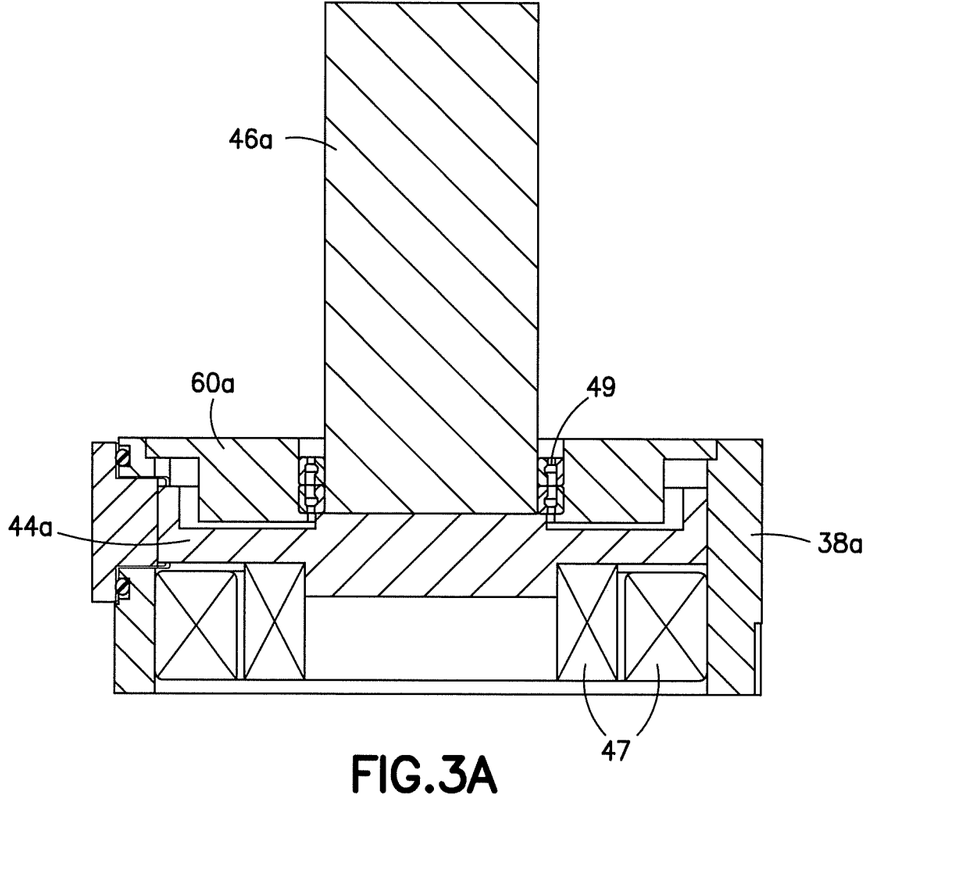
FIG. 3A is a diagram illustrating another example embodiment of the components shown in FIGS. 1-2.

The drive 18 forms a robot motor assembly. In this example the robot motor assembly comprising stators and rotors configured to drive shafts connected to the first link 22 and one of the pulleys in the first link. Referring also to FIG. 3, the drive 18 comprises a housing 38 which separates the environmental area 40 inside the drive 18 and inside the chamber 15 from the environmental area 42 outside the drive and the chamber. A position encoder reference member or disk is connected to each one of the rotors or shafts of the drive 18. FIG. 3 shows an example of this where a position encoder reference member disk 44 is shown attached to the shaft/rotor 46. The housing 38 of the motor assembly has an aperture 48 therethrough. The aperture 48 is aligned with the position encoder reference member disk 44. Attached to the housing 38 is a position read-head 50. The position read-head 50 is located at the aperture 48 through the housing 38 in order for the read-head 50 to sense the location or position of the position encoder reference member disk 44 as the disk 44 is rotated when the rotor/shaft 46 rotates. Output from the read-head 50 is supplied to the controller 54. Another example is shown in FIG. 3A which diagrammatically shows a direct-drive module of a robot, such as the example robot depicted in FIG. 1 in U.S. patent application publication No. 2014/0077637, showing the shaft 46a, a stator and rotor of a motor 47, a direct drive module housing 38a, an encoder track or reference member 44a, bearings 49 and an encoder sensor 60a.

Figure 4:
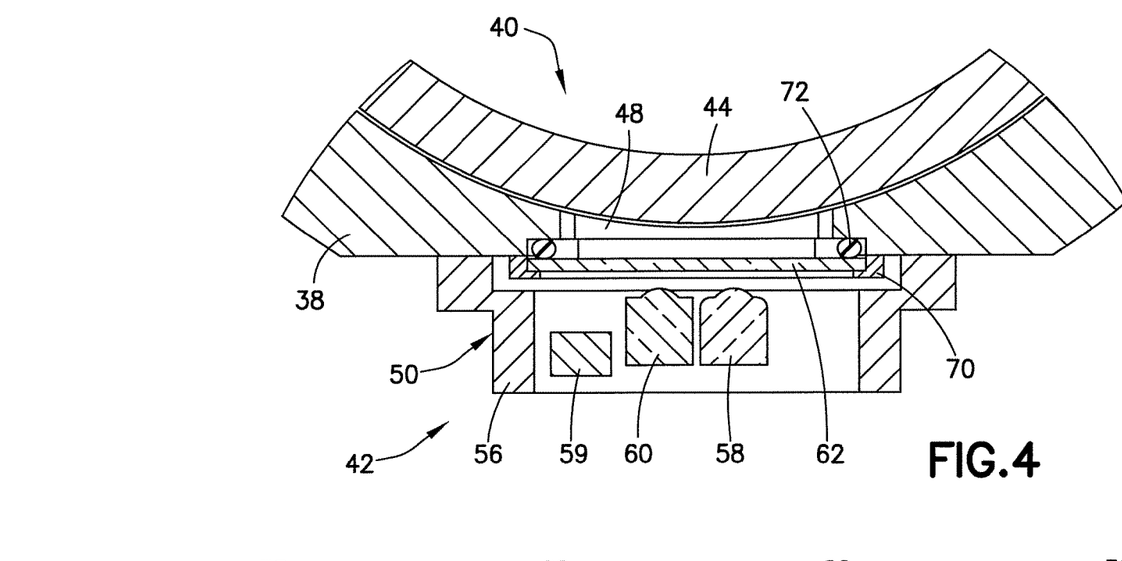
FIG. 4 is a schematic diagram illustrating some of the components shown in FIG. 3.
Figure 4A:
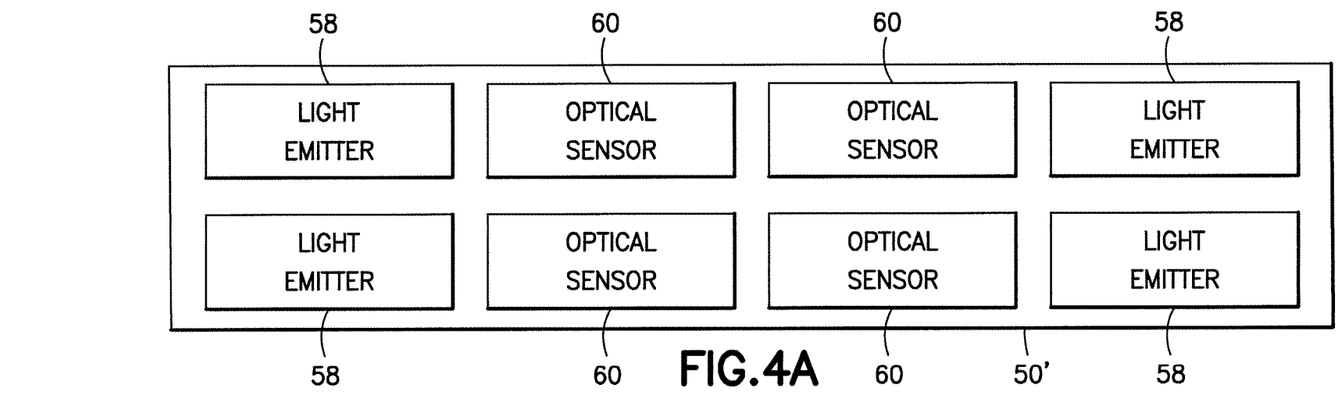
FIG. 4A is a schematic diagram illustrating an example of the read-head shown in FIG. 4.
Figure 4B:
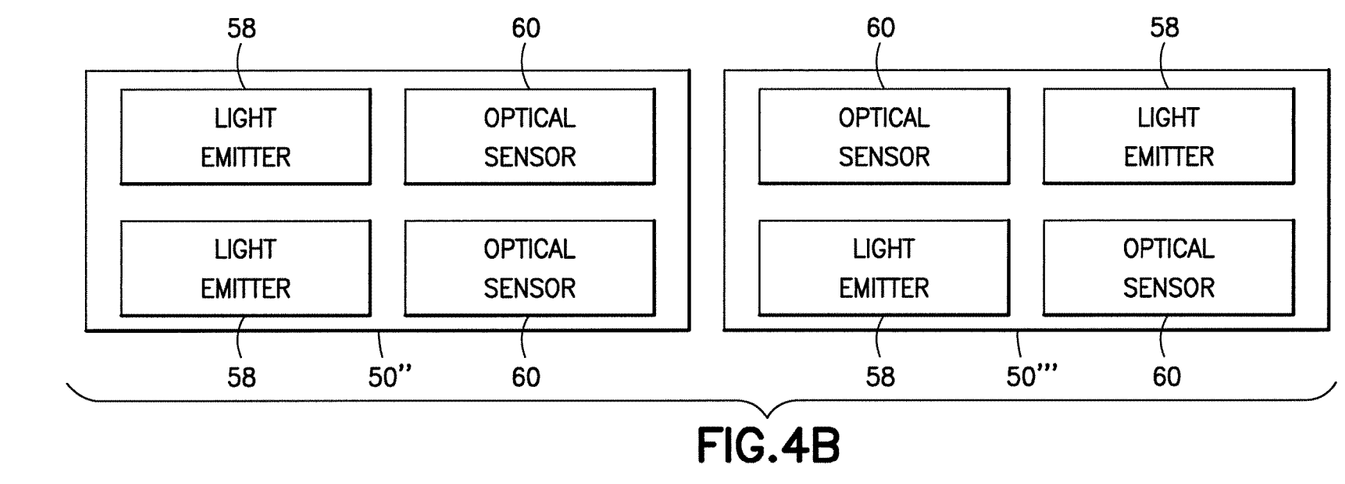
FIG. 4B is a schematic diagram illustrating an example of multiple ones of the read-head shown in FIG. 4.

Referring also to FIG. 4, in this embodiment the position read-head 50 generally comprises a frame 56, a light emitter 58, an optical sensor 60, an environment separation barrier 62 and electronic circuitry 59. In one type of example embodiment the sensor 60 is a plurality of optical sensors arranged as an array for viewing at least one image, and the light emitter 58 comprises a plurality of light emitters. An example of this is shown in FIG. 4A with read-head 50'. In another alternative, as shown in FIG. 4B, the apparatus may comprises multiple read-heads 50", 50''' having different light emitter and optical sensor configurations, but attached to the housing 38 to read the same reference member 44.

Figure 5:
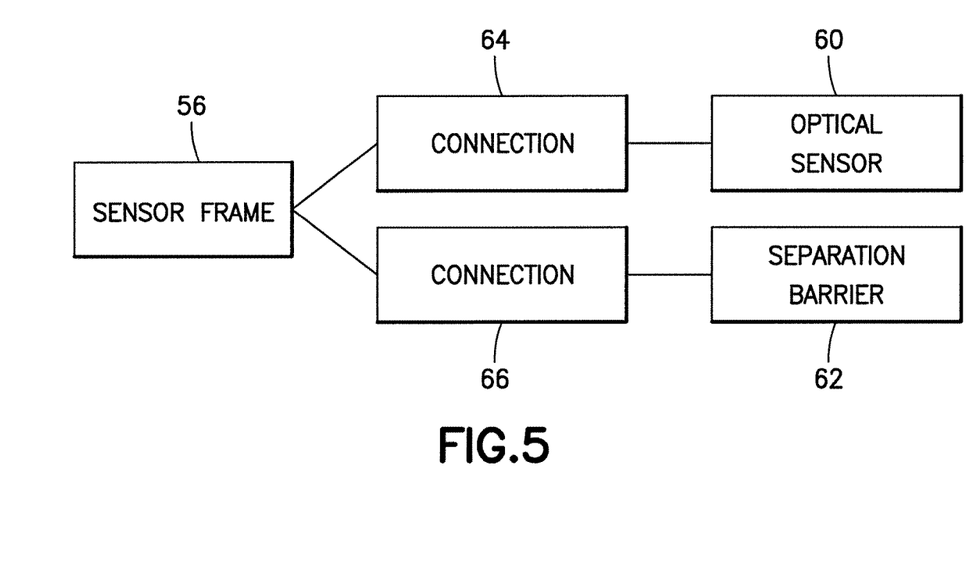
FIG. 5 is a diagram illustrating an example type of connection arrangement in the sensor shown in FIGS. 3-4.
Figure 6:
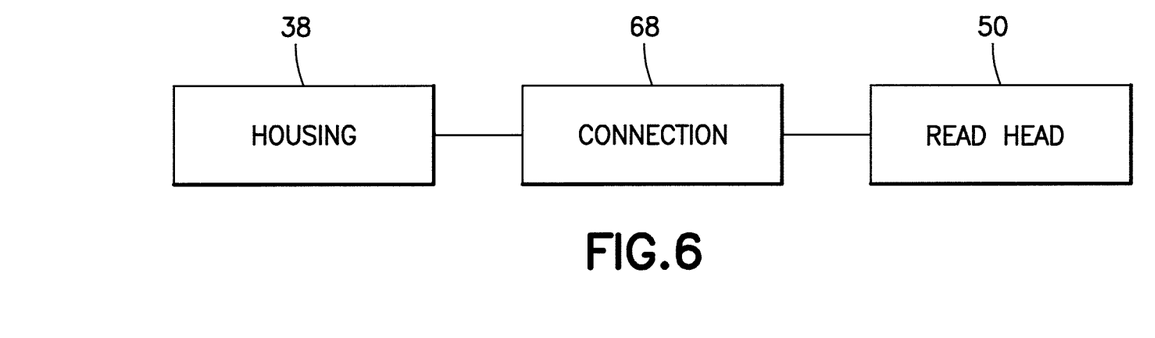
FIG. 6 is a diagram illustrating an example type of connection of the sensor to the housing shown in FIGS. 3-4.

Referring also to FIG. 5, in this example embodiment the first connection 64 is provided between the sensor 60 and the frame 56 and a second connection 66 is provided between the separation barrier 62 and the frame 56. However, as illustrated by FIG. 6, the sensor and the separation barrier 62 may be a unitary assembly with the sensor frame with a single type of connection 68 to the housing 38. The connections 64, 66, may be stationarily fixed or adjustable. In the example shown in FIG. 4, the connection 64 is stationarily fixed, the connection 66 is a resiliently deflectable connection, and the connection 68 is adjustable.

In this example embodiment the environment separation barrier 62 is a transparent window and the optical sensor 60 is a camera. A holder 70 is provided to hold the transparent window 62. The holder 70 is connected by the connection 66 to the frame 56. The holder 70 is biased by the connection 66 in the direction of the aperture 48 to press the transparent window 62 against the seal 72. Thus, the seal 72 and the window 62 seal off the aperture 48 forming an optically transparent barrier between the two environmental areas 40, 42 at the aperture 48. Because the barrier 62 is optically transparent, the camera 60 is still able to view an image from the reference member 44. Because the components of the read-head 50, including the camera 60, light emitter and electronic circuitry 59, are all outside the environmental area 40, there is no risk of outgassing from these components inside the area 40. Because the components of the read-head 50, including the camera 60, light emitter 58 and electronic circuitry 59, are all outside the environmental area 40, no special design or encasement of the read-head 50 or its components is necessary.

With features as described herein, a position encoder may be incorporated into a robot direct-drive module, such as drive 18 or one of a plurality of drive modules which are assembled to form the drive 18. A position encoder track, such as on the disk 44, may be coupled to the driven part 46 of the direct-drive module, and a position read-head may be provided on the outside of the housing 38 of the direct-drive module, for example, as shown in the example embodiments shown in the drawings.

In one exemplary embodiment, as depicted diagrammatically in FIG. 4, the housing 38 of the direct-drive module may feature an aperture (slot) 48 located so that it provides an optical path (view) of the position encoder track from the outside of the housing of the direct-drive module. The aperture 48 may feature a separation barrier 62 to separate the vacuum or other non-atmospheric environment inside of the housing of the direct-drive module from the environment outside of the housing of the direct-drive module. The separation barrier 62 may be made of a substantially transparent material, such as glass or acrylic for example. The separation barrier 62 may be sealed to the housing of the direct-drive module, for example, using an O-ring or a bonded joint, for example, or in any other suitable manner.

The encoder track on the reference member 44 may include features that may be utilized to sense location of the encoder track. As an example, the features may form an incremental track and, in some case, the incremental track may be complemented by an absolute track. As another example, the features may form a pattern that may be decoded using image processing techniques.

As shown in FIG. 4, a read-head 50 may be provided on the outside of the direct-drive module so that it may sense location of the encoder track through the aperture in the housing of the direct-drive module. The read-head may be attached to the housing of the direct-drive module in a substantially fixed manner or it may be coupled to the housing of the direct-drive module in a movable manner to allow for adjustment of the read-head with respect to the encoder track. The adjustment may include the distance between the read-head and the encoder track as well as orientation (for instance, pitch, roll and yaw) of the read-head with respect to the encoder track. Alternatively, the read-head may be held in the proximity of the aperture in any suitable manner.

Still referring to FIG. 4, the read-head may include an enclosure 56 and an optical system (including sensor 60). The read-head may further include other components, such as electronics, to control the read-head, process the data and facilitate communication.

The optical system may be configured to detect the position of the encoder track with respect to the read-head. As an example, the optical system may include one or more light emitters, one or more light receiver and other optical components, such as lenses, mirrors and masks. The light emitter(s) and receiver(s) may be arranged to detect features on the encoder track. For instance, the receiver(s) may detect the features based on reflection of the light produced by the emitter(s).

As another example, the optical system may include one or more light source(s), one or more digital camera(s) and other optical components, such as lenses, mirrors and masks. The light source(s) may be arranged to provide illumination of the encoder track in the field of view of the digital camera(s). The digital camera(s) may be arranged to take periodically pictures (images) of the encoder track. The pictures may be processed by the encoder read-head and/or externally to the encoder read-head, such as at the controller 54 for example, to determine the location of the encoder track with respect to the encoder read-head.

Figure 7:
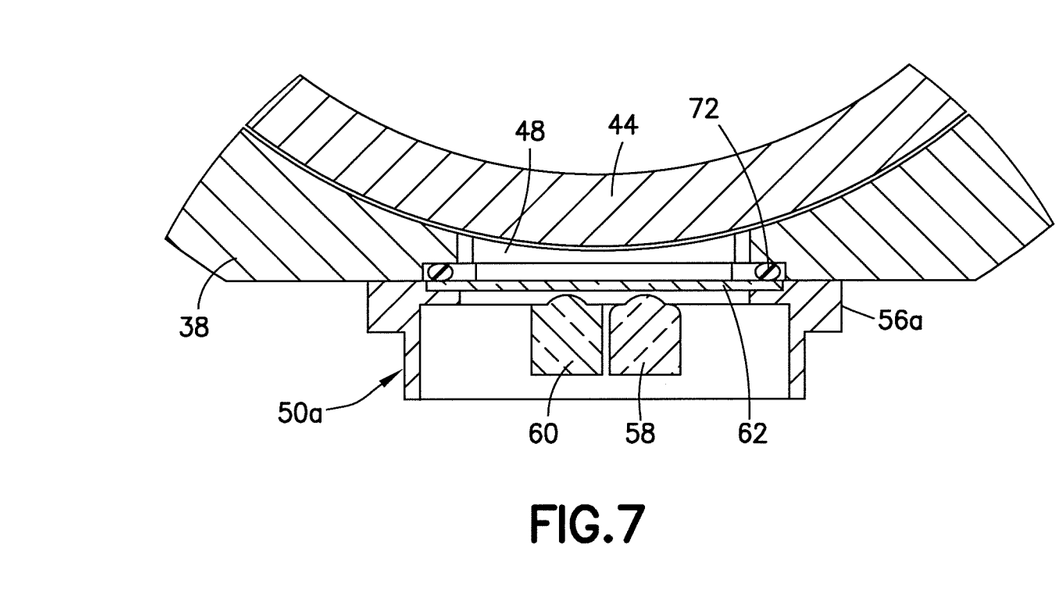
FIG. 7 is a diagram similar to FIG. 4 showing another example embodiment.

In another example embodiment, as depicted diagrammatically in FIG. 7, the housing 38 of the direct-drive module may feature an aperture (slot) 48 located so that it provides an optical path (view) of the position encoder track 44 from the outside of the housing of the direct-drive module. A read-head 50*a* may be provided on the outside of the direct-drive module so that it can sense location of the encoder track 44 through the aperture in the housing of the direct-drive module.

The encoder track 44 may include features that may be utilized to sense location of the encoder track. As an example, the features may form an incremental track and, in some case, the incremental track may be complemented by an absolute track. As another example, the features may form a pattern that may be decoded using image processing techniques.

The read-head 50*a* may include an enclosure 56*a*, a window 62 and an optical system including 58, 60. The read-head 50*a* may further include other components, such as electronics, to control the read-head, process the data and facilitate communication.

As depicted in FIG. 7, the window 62 may be located in the enclosure of the read-head to provide an optical path (view) between the optical system 58, 60 and the encoder track 44 through the aperture 48 in the housing 38 of the direct-drive module. The window 62 may be made of a substantially transparent material, such as glass or acrylic.

The optical system may be configured to detect the position of the encoder track 44 with respect to the read-head. As an example, the optical system may include one or more light emitter(s), one or more light receiver(s) and other optical components, such as lenses, mirrors and masks. The light emitter(s) and receiver(s) may be arranged to detect features on the encoder track. For instance, the receiver(s) may detect the features based on reflection of the light produced by the emitter(s). The light source(s) may be arranged to provide illumination of the encoder track in the field of view of the digital camera(s). The digital camera(s) 60 may be arranged to take periodically pictures (images) of the encoder track. The pictures may be processed by the encoder read-head to determine the location of the encoder track with respect to the encoder read-head.

The read-head 50*a* may be attached to the housing 38 of the direct-drive module so that the window 62 of the read-head is sealed with respect to the housing 38 of the direct-drive module around the aperture 48 of the direct drive module, thus separating the vacuum or other non-atmospheric environment inside of the housing of the direct-drive module from the environment outside of the direct-drive module. As a result, the components inside of the enclosure of the read-head 50*a* are not exposed to the vacuum or other non-atmospheric environment inside of the housing of the direct-drive module.

Figure 8:
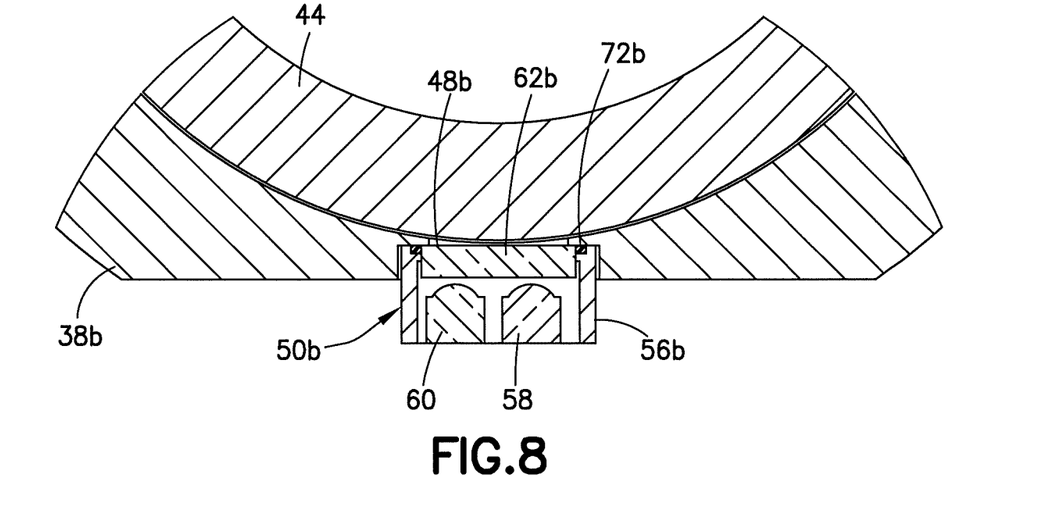
FIG. 8 is a diagram similar to FIG. 4 showing another example embodiment.
Figure 9:
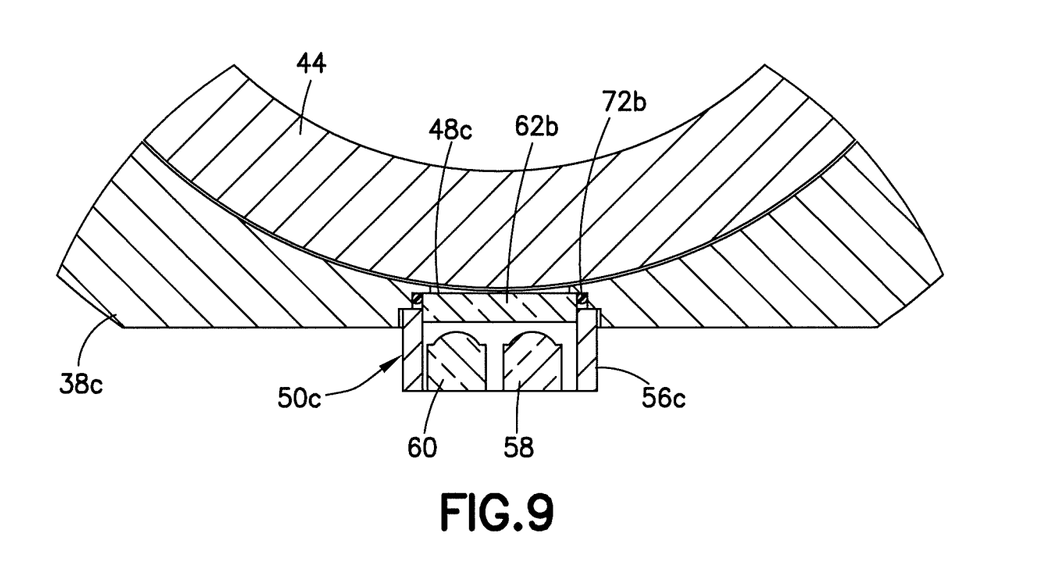
FIG. 9 is a diagram similar to FIG. 4 showing another example embodiment.
Figure 10:
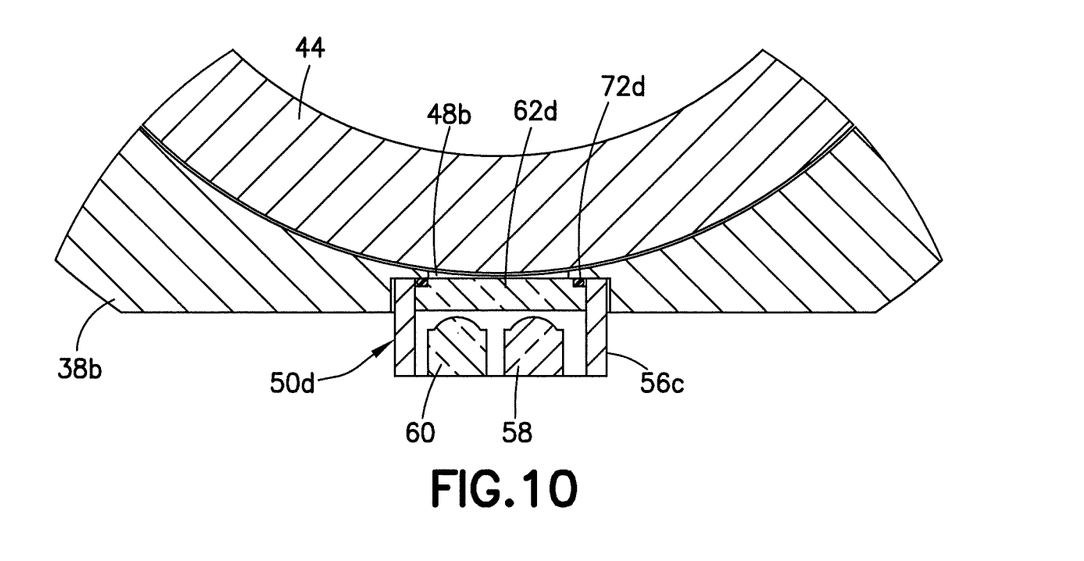
FIG. 10 is a diagram similar to FIG. 4 showing another example embodiment.
Figure 11:
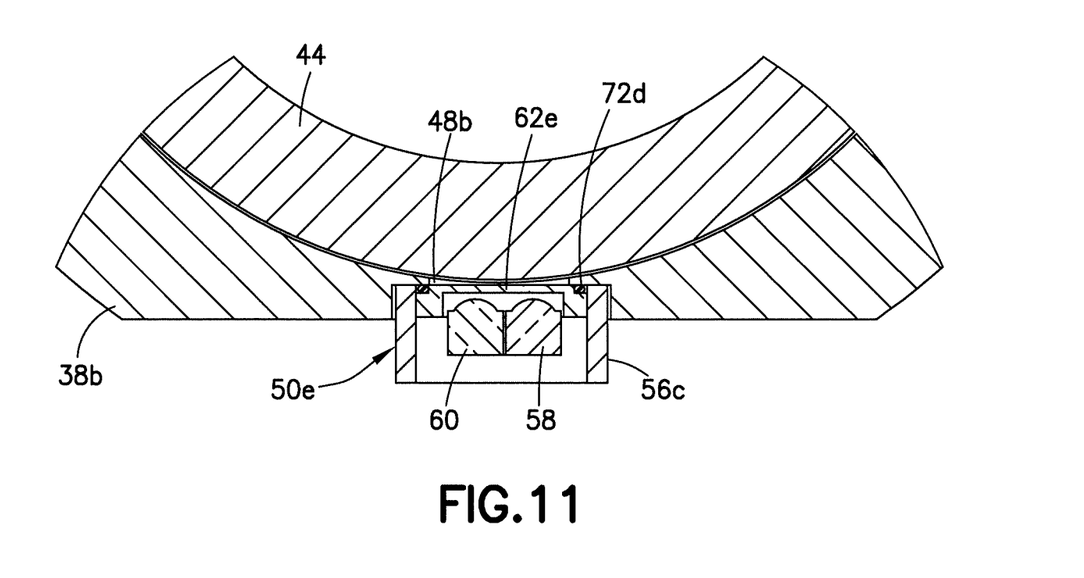
FIG. 11 is a diagram similar to FIG. 4 showing another example embodiment.

As illustrated in FIG. 7, the read-head may be attached to the housing of the direct-drive module in a substantially fixed manner, and the window 62 may be sealed to the housing 38 of the direct-drive module using an O-ring or any other suitable seal. Additional examples of seal configurations are depicted diagrammatically in FIGS. 8, 9 (seal compressed in the direction normal to the direction of the installation of the read-head) and 10 (O-ring compressed along the direction of the installation of the read-head). FIG. 8 shows housing 38*b* with aperture 48*b*, and the read-head 50*b* having frame 56*b*, seal 72*b*, window 62*b* and optical components including light emitter 58 and sensor 60. FIG. 9 shows housing 38*c* with aperture 48*c*, and the read-head 50*c* having frame 56*c*, seal 72*b*, window 62*b* and optical components including light emitter 58 and sensor 60. FIG. 10 shows housing 38*b* with aperture 48*b*, and the read-head 50*d* having frame 56*c*, seal 72*d*, window 62*d* and optical components including light emitter 58 and sensor 60. The window 62 may also be shaped to provide adequate space for the seal and, at the same time, allow for desirably close proximity of the components of the sensor to the encoder track, as illustrated in FIG. 11. FIG. 11 shows housing 38*b* with aperture 48*b*, and the read-head 50*e* having frame 56*c*, seal 72*d*, window 62*e* and optical components including light emitter 58 and sensor 60.

It should be noted that in all of the example configurations of FIGS. 7-11 the window 62 may be merely mechanically fastened, but not necessarily sealed, with respect to the enclosure 56 of the sensor, and the sealing takes place between the window 62 and the housing 38 of the direct-drive module. It should be noted that the window 62 in the examples of FIGS. 7-11 may not necessarily be a separate component. The window 62 may be conveniently formed by a component of the optical system of the read-head, such as a lens, or by any other suitable component.

Alternatively, the read-head may be coupled to the housing of the direct-drive module in a movable manner to allow for adjustment of the sensor with respect to the encoder track. The adjustment may include the distance between the read-head and the encoder track as well as orientation (for instance, pitch, roll and yaw) of the read-head with respect to the encoder track. The window of the sensor may be sealed to the housing of the direct-drive module by an O-ring, a bellows, a flexure or any other suitable seal providing the sensor with sufficient movement while maintaining a seal.

Figure 12:
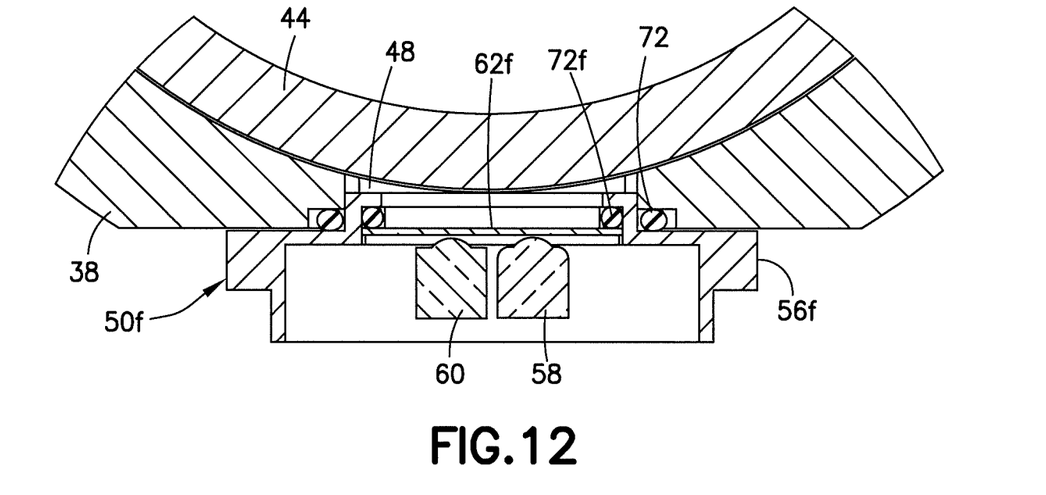
FIG. 12 is a diagram similar to FIG. 4 showing another example embodiment.

In yet another example embodiment, as depicted diagrammatically in FIG. 12, the housing of the direct-drive module may feature an aperture (slot) located so that it provides an optical path (view) of the position encoder track from the outside of the housing of the direct-drive module. A read-head may be provided on the outside of the direct-drive module so that it can sense location of the encoder track through the aperture in the housing of the direct-drive module. FIG. 12 shows housing 38 with aperture 48, and the read-head 50*f* having frame 56*f*, seal 72, window 62*f*, seal 72*f* and optical components including light emitter 58 and sensor 60.

The encoder track may include features that may be utilized to sense location of the encoder track. As an example, the features may form an incremental track and, in some case, the incremental track may be complemented by an absolute track. As another example, the features may form a pattern that may be decoded using image processing techniques.

The read-head may include an enclosure, a window and an optical system. The read-head may further include other components, such as electronics, to control the read-head, process the data and facilitate communication.

As depicted in FIG. 12, the window may be located in the enclosure of the read-head to provide an optical path (view) between the optical system and the encoder track through the aperture in the housing of the direct-drive module. The window may be made of a substantially transparent material, such as glass or acrylic. The window may be sealed to the enclosure of the sensor, for instance, using an O-ring or a bonded joint.

The optical system may be configured to detect the position of the encoder track with respect to the read-head. As an example, the optical system may include one or more light emitters, one or more light receivers and other optical components, such as lenses, mirrors and masks. The light emitter(s) and receiver(s) may be arranged to detect features on the encoder track. For instance, the receiver(s) may detect the features based on reflection of the light produced by the emitter(s).

As another example, the optical system may include one or more light source(s), one or more digital camera(s) and other optical components, such as lenses, mirrors and masks. The light source(s) may be arranged to provide illumination of the encoder track in the field of view of the digital camera(s). The digital camera(s) may be arranged to take periodically pictures (images) of the encoder track. The pictures may be processed by the encoder read-head to determine the location of the encoder track with respect to the encoder read-head.

The read-head may be attached to the housing of the direct-drive module so that the enclosure of the sensor is sealed with respect to the housing of the direct-drive module around the aperture of the direct drive module and around the window of the read-head, thus separating the vacuum or other non-atmospheric environment inside of the housing of the direct-drive module from the environment outside of the direct-drive module and, furthermore, separating the components inside of the enclosure of the read-head from the vacuum or other non-atmospheric environment inside of the housing of the direct-drive module. This prevents exposure of the components inside of the enclosure of the read-head from the vacuum or other non-atmospheric environment inside of the housing of the direct-drive module.

Figure 14:
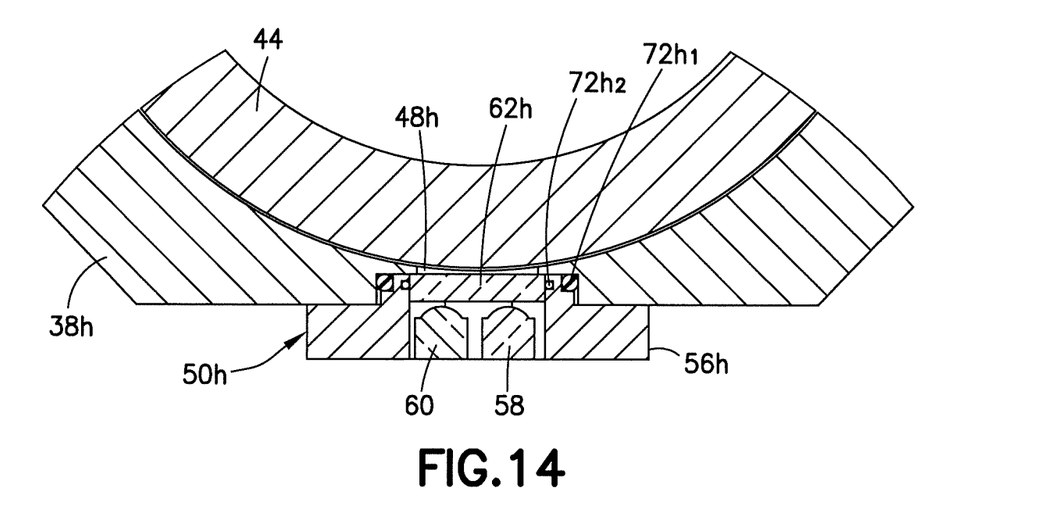
FIG. 14 is a diagram similar to FIG. 4 showing another example embodiment.
Figure 15:
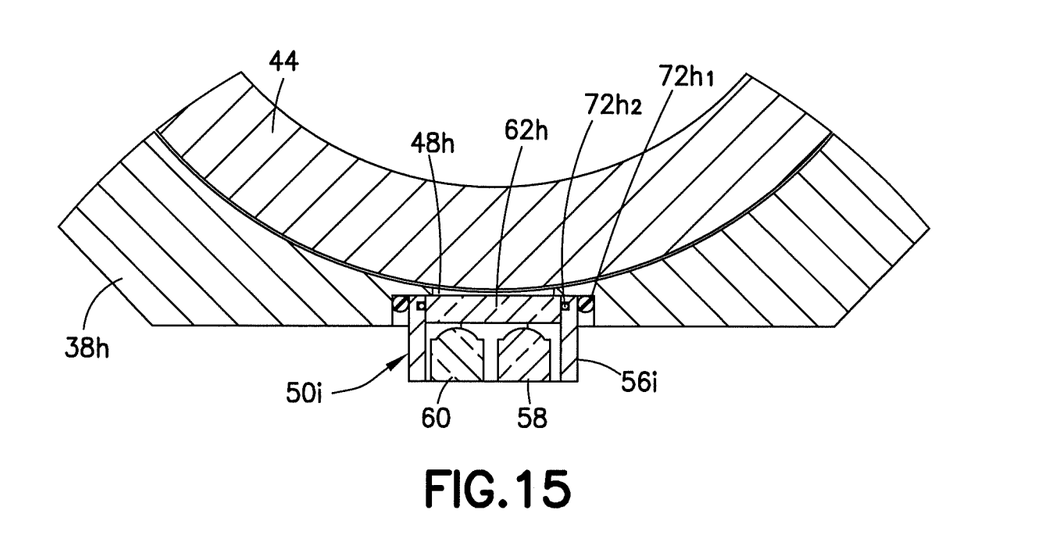
FIG. 15 is a diagram similar to FIG. 4 showing another example embodiment.

As illustrated in FIG. 12, the read-head may be attached to the housing of the direct-drive module in a substantially fixed manner, and the enclosure of the sensor may be sealed to the housing of the direct-drive module using an O-ring or any other suitable seal. Additional example embodiments where the window is sealed to the enclosure of the read-head and the enclosure of the read-head is in turn sealed to the housing of the direct-drive module are depicted diagrammatically in FIGS. 14-15. FIG. 14 shows housing 38*h* with aperture 48*h*, and the read-head 50*h* having frame 56*h*, seals 72*h*1, 72*h*2, window 62*h* and optical components including light emitter 58 and sensor 60. FIG. 15 shows housing 38*h* with aperture 48*h*, and the read-head 50*i* having frame 56*i*, seals 72*h*1, 72*h*2, window 62*h* and optical components including light emitter 58 and sensor 60.

It should be noted that the window in the example of FIG. 12 may not necessarily be a separate component. The window may be conveniently formed by a component of the optical system of the sensor, such as a lens, or by any other suitable component.

Alternatively, the read-head may be coupled to the housing of the direct-drive module in a movable manner to allow for adjustment of the read-head with respect to the encoder track. The adjustment may include the distance between the read-head and the encoder track as well as orientation (for instance, pitch, roll and yaw) of the read-head with respect to the encoder track. The enclosure of the read-head may be sealed to the housing of the direct-drive module by an O-ring, a bellows, a flexure or any other suitable seal providing the read-head with sufficient movement while maintaining a seal.

Figure 13:
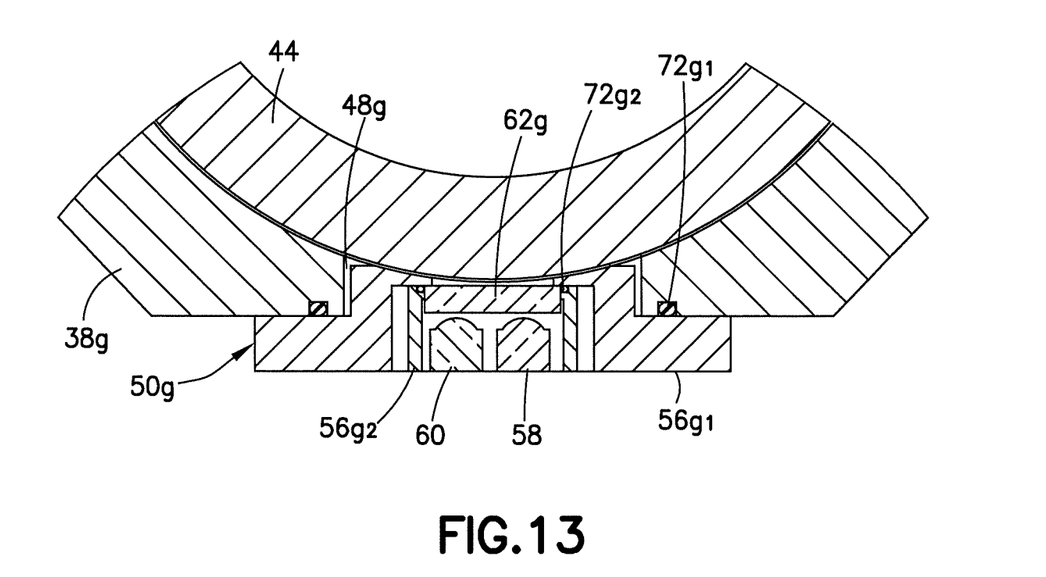
FIG. 13 is a diagram similar to FIG. 4 showing another example embodiment.

In yet another example embodiment, as depicted diagrammatically in FIG. 13, the housing of the direct-drive module may feature an aperture (slot) located so that it provides an optical path (view) of the position encoder track from the outside of the housing of the direct-drive module. FIG. 13 shows housing 38*g* with aperture 48*g*, and the read-head 50*g* having frame members 56*g*1, 56*g*2, seals 72*g*1, 72*g*2, window 62g and optical components including light emitter 58 and sensor 60. A sensor may be provided on the outside of the direct-drive module so that it can sense location of the encoder track through the aperture in the housing of the direct-drive module.

The encoder track may include features that may be utilized to sense location of the encoder track. As an example, the features may form an incremental track and, in some case, the incremental track may be complemented by an absolute track. As another example, the features may form a pattern that may be decoded using image processing techniques.

The read-head may include a first enclosure, a window and an optical system. The sensor may further include other components, such as electronics, to control the read-head, process the data and facilitate communication.

As depicted in FIG. 13, the window may be located in the first enclosure of the read-head to provide an optical path (view) between the optical system and the encoder track through the aperture in the housing of the direct-drive module. The window may be mechanically fastened to the first enclosure of the read-head and sealed to a second enclosure (window seal in FIG. 13), neither enclosure being the housing of the direct-drive module. The second enclosure may then seal to the housing of the direct-drive module (enclosure seal in FIG. 13). This allows a read-head housings never intended to act as a barrier between atmosphere and non-atmosphere environments to do be utilized.

The window may be made of a substantially transparent material, such as glass or acrylic. Alternatively, as explained with respect to the examples for FIGS. 6-12, the window may be conveniently formed by a component of the optical system of the read-head, such as a lens, another optical element intended to affect light, or any other suitable component.

The window may be sealed to the first enclosure of the read-head, for instance, using an O-ring or a bonded joint. If desired, the seal may be accomplished by the addition of a feature to the window, such as a flange. Alternatively, the seal may be accomplished by using features available on commercially available read-heads.

The optical system may be configured to detect the position of the encoder track with respect to the read-head. As an example, the optical system may include one or more light emitters, one or more light receivers and other optical components, such as lenses, mirrors and masks. The light emitter(s) and receiver(s) may be arranged to detect features on the encoder track. For instance, the receiver(s) may detect the features based on reflection of the light produced by the emitter(s).

As another example, the optical system may include one or more light source(s), one or more digital camera(s) and other optical components, such as lenses, mirrors and masks. The light source(s) may be arranged to provide illumination of the encoder track in the field of view of the digital camera(s). The digital camera(s) may be arranged to take periodically pictures (images) of the encoder track. The pictures may be processed by the encoder read-head to determine the location of the encoder track with respect to the encoder read-head.

The read-head may be attached to the housing of the direct-drive module so that the second enclosure is sealed with respect to the housing of the direct-drive module. The second enclosure is then sealed to the window of the read-head, thus separating the vacuum or other non-atmospheric environment inside of the housing of the direct-drive module from the environment outside of the direct-drive module and, furthermore, separating the components inside of the second enclosure from the vacuum or other non-atmospheric environment inside of the housing of the direct-drive module. This prevents exposure of the components inside of the second enclosure from the vacuum or other non-atmospheric environment inside of the housing of the direct-drive module.

Alternatively, the second enclosure may be coupled to the housing of the direct-drive module in a movable manner to allow for adjustment of the read-head with respect to the encoder track. The adjustment may include the distance between the read-head and the encoder track as well as orientation (for instance, pitch, roll and yaw) of the read-head with respect to the encoder track. The second enclosure may be sealed to the housing of the direct-drive module by an O-ring, a bellows, a flexure or any other suitable seal providing the read-head with sufficient movement while maintaining a seal.

Although the above example embodiments show the read-head looking radially inward, it may be arranged to look radially out, for example pointing at an internal cylindrical surface of the disk, or to look axially up or down, for example, pointing at one of the flat faces of the disk.

Features as described herein may be used to provide a drive arrangement (such as a robot drive arrangement) with an optical encoder where the disk of the optical encoder is in one environment (such as vacuum environment) and the components of the read-head of the optical encoder, including its optical system and control electronics, are in another environment (such as an atmospheric environment) and there is a substantially transparent barrier between the disk and the components of the read-head.

Although the example embodiments show the read-head looking radially inward, the sensor may be arranged to look radially out on an internal cylindrical surface of the disk, or to look axially (up or down) on one of the flat faces of the disk 44. This arrangement may be extended to linear applications including, for example, the example linear robots described in U.S. patent publication Nos. 2015/0214086 A1, 2016/0229296 A1 and 2017/0036358 A1 which are hereby incorporated by reference in their entireties.

An example apparatus comprises a frame, where the frame is configured to be attached to a housing of a motor assembly proximate an aperture which extends through the housing; a position sensor connected to the frame, where the position sensor comprises a camera; and an environment separation barrier configured to be connected to the housing at the aperture, where the environment separation barrier is at least partially transparent and located relative to the camera to allow the camera to view an image inside the housing through the environment separation barrier and the aperture. The environment separation barrier may be connected directly to the housing at the aperture or may be indirectly connected to the housing, such as via the frame of the apparatus, but the environment separation barrier forms at least part of the environment closure of the aperture through the housing while also providing an optical path.

The apparatus may comprise a seal configured to be located directly between the environment separation barrier and the housing of the motor assembly. The apparatus may comprise a first seal connected directly between the environment separation barrier and the frame. The apparatus may comprise a second seal configured to be located directly between the frame and the housing of the motor assembly. The apparatus may comprise a seal and a barrier holder configured to press the environment separation barrier against the seal, where the barrier holder is configured to be pressed by the frame towards the aperture. The apparatus may comprise a connection between the barrier holder and the frame which is resilient to allow the barrier holder to move relative to the frame, and where the connection biases the barrier holder towards the aperture when the frame is connected to the housing. The environment separation barrier may comprise a transparent window which directly contacts the frame and is configured to be pressed by the frame towards the aperture when the frame is connected to the housing. The apparatus may comprise the housing, a rotor inside the housing having a position reference member configured to be imaged by the camera and at least one seal, where the frame is connected to the housing with the at least one seal and the environment separation barrier sealing the aperture to separate a first environmental area inside the housing from a second environmental area outside the housing. The frame may not be exposed to the first environmental area inside the housing.

An example method may comprise providing a read-head comprising a frame and a camera connected to the frame; connecting the read-head to a housing of a motor assembly, where the frame of the read-head is connected to the housing proximate an aperture which extends through the housing; and locating an environment separation barrier at the aperture to separate a first environmental area inside the housing from a second environmental area in which the camera is located, where the environment separation barrier is at least partially transparent and located relative to the camera to allow the camera to view an image inside the housing through the environment separation barrier and the aperture.

The method may comprise locating a seal being directly between the environment separation barrier and the housing of the motor assembly. The method may comprise connecting a first seal directly between the environment separation barrier and the frame. The method may comprise locating a second seal directly between the frame and the housing of the motor assembly. The method may comprise a barrier holder biasing the environment separation barrier against a seal, where the barrier holder is pressed by the frame towards the aperture. The method may comprise proving a connection between the barrier holder and the frame which is resilient to allow the barrier holder to move relative to the frame, and where the connection biases the barrier holder towards the aperture when the frame is connected to the housing. The environment separation barrier may comprise a transparent window which directly contacts the frame and is pressed by the frame towards the aperture when the frame is connected to the housing. The method may comprise a rotor is inside the housing and a position reference member configured to be imaged by the camera, where the frame is connected to the housing with at least one seal and the environment separation barrier to seal the aperture to separate a first environmental area inside the housing from a second environmental area outside the housing. The frame may not be exposed to the first environmental area inside the housing.

An example method may comprise illuminating a reference member located inside a housing of a motor assembly by a light emitter of a sensor, where the sensor is located outside of the housing; viewing an image of the reference member by a camera of the sensor, where the camera is located outside of the housing, where the image is viewed by the camera though an aperture in the housing and through a transparent environment separation barrier located at the aperture, where the transparent environment separation barrier seals a first environment inside the housing from a second environment in which the sensor is located, and where the camera is located outside of the first environment and the transparent environment separation barrier allows the camera to view the image coming from inside the housing while the camera is outside of the first environment.

The example of FIG. 4 illustrates a viewport in the housing of the direct-drive module. The examples of FIGS. 7-11 illustrate a seal directly between the window and the housing of the direct-drive module. The examples of FIGS. 12 and 14-15 illustrate a seal between the window and the enclosure of the read-head and another seal between the enclosure of the read-head and the housing of the direct-drive module. The example of FIG. 13 illustrates two enclosures.

An example embodiment may be provided in an apparatus comprising a frame, where the frame is configured to be attached to a housing of a motor assembly proximate an aperture which extends through the housing; at least one light emitter connected to the frame; an array of optical sensors connected to the frame; and an environment separation barrier configured to be connected to the housing at the aperture, where the environment separation barrier is at least partially transparent and located relative to the array of optical sensors to allow the array of optical sensors to view an image inside the housing through the environment separation barrier and the aperture.

An example method may be provided comprising providing a read-head comprising a frame, at least one light emitter connected to the frame, and an array of optical sensors connected to the frame; connecting the read-head to a housing of a motor assembly, where the frame of the read-head is connected to the housing proximate an aperture which extends through the housing; and locating an environment separation barrier at the aperture to separate a first environmental area inside the housing from a second environmental area in which the array of optical sensors is located, where the environment separation barrier is at least partially transparent and located relative to the array of optical sensors to allow the array of optical sensors to view an image inside the housing through the environment separation barrier and the aperture.

An example method may be provided comprising illuminating a reference member located inside a housing of a motor assembly by at least one light emitter of a read-head, where the read-head is located At least partially outside of the housing; viewing at least one image of the reference member by an array of optical sensors of the read-head, where the array of optical sensors is located at least partially outside of the housing, where the at least one image is viewed by the array of optical sensors though an aperture in the housing and through a transparent environment separation barrier located at the aperture, where the transparent environment separation barrier seals a first environment inside the housing from a second environment in which the array of optical sensors is located, and where the array of optical sensors is located outside of the first environment and the transparent environment separation barrier allows the array of optical sensors to view the at least one image coming from inside the housing while the camera is outside of the first environment.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
providing a read-head comprising a frame, at least one light emitter connected to the frame, and an array of optical sensors connected to the frame;
connecting the read-head to a housing of a motor assembly, where the frame of the read-head is connected to the housing proximate an aperture which extends through the housing; and
locating an environment separation barrier at the aperture to separate a first environmental area inside the housing from a second environmental area in which the array of optical sensors is located, where the environment separation barrier is at least partially transparent and located relative to the array of optical sensors to allow the array of optical sensors to view an image inside the housing through the environment separation barrier and the aperture,
where a rotor is inside the housing and has a position reference member configured to be imaged by the array of optical sensors, where the frame is connected to the housing with at least one seal and the environment separation barrier to seal the aperture to separate a first environmental area inside the housing from a second environmental area outside the housing.

2. A method as in claim 1 further comprising locating a seal of the at least one seal directly between the environment separation barrier and the housing of the motor assembly.

3. A method as in claim 1 further comprising connecting a first seal of the at least one seal directly between the environment separation barrier and the frame.

4. A method as in claim 3 further comprising locating a second seal of the at least one seal directly between the frame and the housing of the motor assembly.

5. A method comprising:
providing a read-head comprising a frame, at least one light emitter connected to the frame, and an array of optical sensors connected to the frame;
connecting the read-head to a housing of a motor assembly, where the frame of the read-head is connected to the housing proximate an aperture which extends through the housing; and
locating an environment separation barrier at the aperture to separate a first environmental area inside the housing from a second environmental area in which the array of optical sensors is located, where the environment separation barrier is at least partially transparent and located relative to the array of optical sensors to allow the array of optical sensors to view an image inside the housing through the environment separation barrier and the aperture,
where a barrier holder biases the environment separation barrier against a seal, and where the barrier holder is pressed by the frame towards the aperture.

6. A method as in claim 5 further comprising proving a connection between the barrier holder and the frame which is resilient to allow the barrier holder to move relative to the frame, and where the connection biases the barrier holder towards the aperture when the frame is connected to the housing.

7. A method as in claim 1 where the environment separation barrier comprises a transparent window which directly contacts the frame and is pressed by the frame towards the aperture when the frame is connected to the housing.

8. A method as in claim 1 where the frame is not exposed to the first environmental area inside the housing.

9. A method as in claim 1 where the array of optical sensors comprises at least one camera.

* * * * *